(12) United States Patent  (10) Patent No.: US 8,521,391 B2
Krueger et al. (45) Date of Patent: Aug. 27, 2013

(54) METHODS AND SYSTEMS FOR BRAKE PEDAL TUNING AND BRAKING CONTROL IN VEHICLES

(75) Inventors: Eric E. Krueger, Chelsea, MI (US); Kevin S. Kidston, New Hudson, MI (US); Danny Y. Mui, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 807 days.

(21) Appl. No.: 12/627,610

(22) Filed: Nov. 30, 2009

(65) Prior Publication Data

US 2011/0130935 A1 Jun. 2, 2011

(51) Int. Cl.
*B60T 8/17* (2006.01)

(52) U.S. Cl.
USPC ........... 701/78; 701/70; 701/79; 303/138; 303/155; 303/176

(58) Field of Classification Search
USPC ............. 303/138, 155, 176; 701/70, 78, 701/79
See application file for complete search history.

(56) References Cited

U.S. PATENT DOCUMENTS 5,558,409 A * 9/1996 Walenty et al. .......... 303/10
5,564,797 A * 10/1996 Steiner et al. .......... 303/113.4

* cited by examiner

*Primary Examiner* — Thomas Tarcza
*Assistant Examiner* — Adam Tissot
(74) *Attorney, Agent, or Firm* — Ingrassia Fisher & Lorenz, P.C.

(57) ABSTRACT

A method for calibrating a braking system of a vehicle having a brake pedal includes the steps of measuring, via a sensor, a speed of the vehicle, generating, via a processor, an optimized mapping relating a movement of the brake pedal and a deceleration of the vehicle based at least in part upon the speed of the vehicle, and calibrating, via the processor, a relationship between an engagement of the brake pedal and the deceleration of the vehicle using the optimized mapping.

12 Claims, 2 Drawing Sheets

METHODS AND SYSTEMS FOR BRAKE PEDAL TUNING AND BRAKING CONTROL IN VEHICLES

TECHNICAL FIELD

The present invention generally relates to the field of vehicles and, more specifically, to methods and systems for calibrating braking systems and controlling braking in vehicles.

BACKGROUND OF THE INVENTION

To enhance an operator's driving experience and a vehicle's performance and safety, various types of electronic enhancements and systems assist or replicate automotive systems that were previously mechanical in nature. One such automotive system is the brake-by-wire system. In a brake-by-wire system, an operator's activation of the brake pedal is determined by one or more sensors. Data from the sensors is then used by a computer or processor to determine an appropriate braking force to apply to the brakes.

Several different types of brake-by-wire systems exist. For example, in an electro-hydraulic braking system, the computer commands an electro-hydraulic actuator to apply hydraulic pressure to the brake calipers to stop the vehicle. In contrast, in an electro-mechanical braking system, the braking force is applied instead by an electronic caliper which utilizes a small motor to push the brake pads against the rotor to stop the vehicle. Additionally, vehicles can incorporate combined systems such as electro-mechanical and electro-hydraulic systems. Also, hybrid cars can utilize a combination of friction braking, which can be electro-mechanical or electro-hydraulic, and regenerative braking, which is also a type of electronic braking in which speed is reduced by converting kinetic energy into electrical energy Regardless of the particular type of braking system, braking systems generally utilize one or more driver-related inputs, such as a measure of brake pedal travel and/or a measure of brake pedal force, in determining driver intent. However, it may be desirable to improve upon the use of such driver-related inputs. It may also be desirable to improve calibration of braking system in vehicles, for example to tune the brake pedal travel or force measures used by the braking system of the vehicle.

Accordingly, it is desirable to provide an improved method for controlling braking for a vehicle and/or calibrating a braking system of a vehicle, for example that tunes or improves upon the brake pedal travel or force measures used by the braking system. It is also desirable to provide an improved system for controlling braking for a vehicle and/or calibrating a braking system of a vehicle, for example that tunes or improves upon the brake pedal travel or force measures used by the braking system. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for calibrating a braking system of a vehicle having a brake pedal is provided. The method comprises the steps of measuring, via a sensor, a speed of the vehicle, generating, via a processor, an optimized mapping relating a movement of the brake pedal and a deceleration of the vehicle based at least in part upon the speed of the vehicle, and calibrating, via the processor, a relationship between an engagement of the brake pedal and the deceleration of the vehicle using the optimized mapping.

In accordance with another exemplary embodiment of the present invention, a method for controlling braking in a vehicle having a brake pedal and brake units is provided. The method comprises the steps of measuring a movement of the brake pedal, measuring a speed of the vehicle, and providing braking torque to the brake units in an amount based at least in part on the movement of the brake pedal and the speed of the vehicle.

In accordance with a further exemplary embodiment of the present invention, a system for controlling braking in a vehicle having a brake pedal is provided. The system comprises a brake pedal, a first sensor, a second sensor, and a brake controller. The first sensor is configured to at least facilitate measuring movement of the brake pedal. The second sensor is configured to at least facilitate measuring a speed of the vehicle. The brake controller is coupled to the first sensor and the second sensor, and is configured to at least facilitate providing braking torque in an amount based at least in part on the movement of the brake pedal and the speed of the vehicle.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
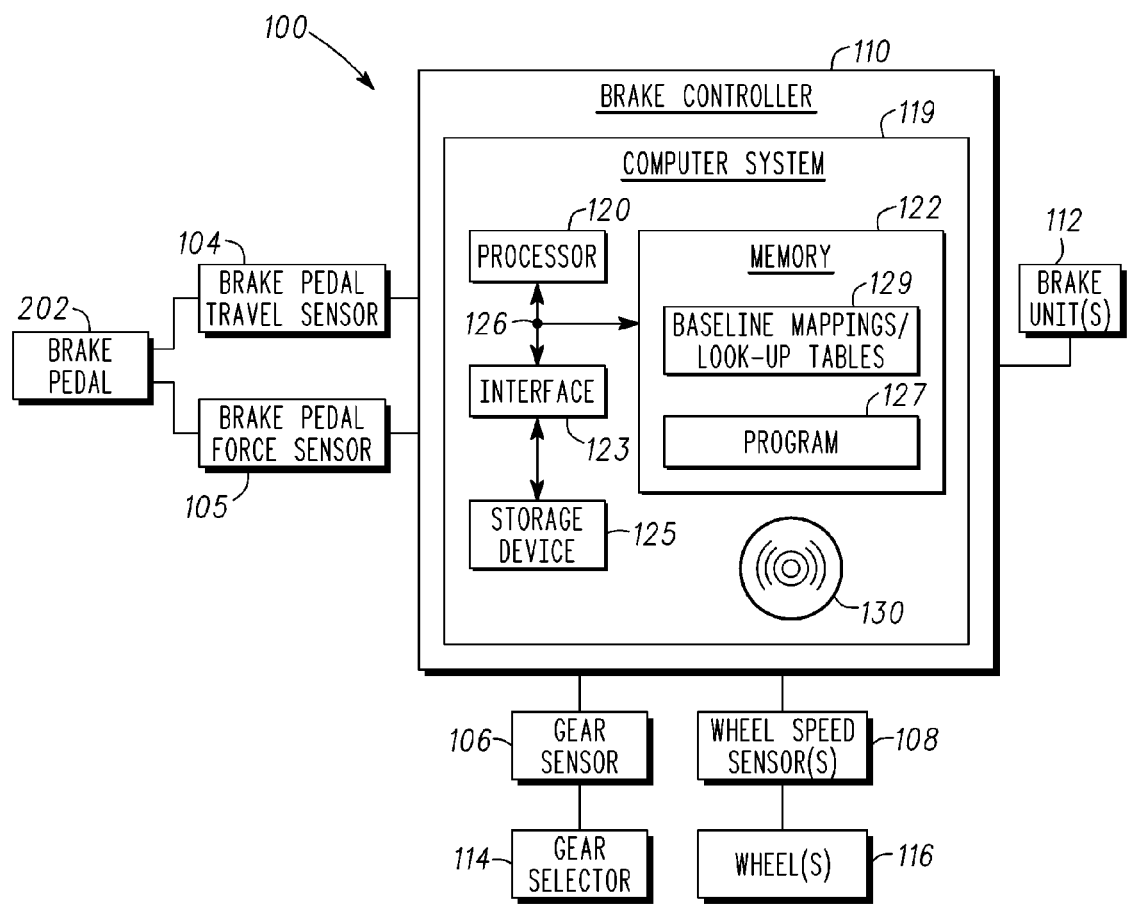
FIG. 1 is a functional block diagram of a control system for use in controlling braking in a vehicle, in accordance with an exemplary embodiment of the present invention.

FIG. 1 is a block diagram of an exemplary braking system 100 for use in a brake-by-wire system. The braking system 100 includes a brake pedal 102, a brake pedal travel sensor 104, a brake pedal force sensor 105, a gear sensor 106, at least one wheel speed sensor 108, a brake controller 110, and a plurality of brake units 112. The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system.

The brake pedal travel sensor 104 is coupled to the brake pedal 102. The brake pedal travel sensor 104 provides an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved. Other methods of measuring brake travel can also be utilized. Regardless of the particular method utilized, the brake pedal travel sensor 104 collects brake pedal travel data for ultimate use by the brake controller 110 in controlling braking for the vehicle and/or calibrating the braking system 100, as described further below. It will be appreciated that multiple brake pedal travel sensors 104 may be used in various embodiments.

The brake pedal force sensor 105 is coupled to the brake pedal 102. The brake pedal force sensor 105 determines how much force the operator of braking system 100 is applying to the brake pedal 102, which is also known as brake pedal force. In one exemplary embodiment, the brake pedal force sensor 105 includes a hydraulic pressure emulator and/or a pressure transducer, and the brake pedal force can be determined by measuring hydraulic pressure in a master cylinder of the braking system 100. Regardless of the particular method utilized, the brake pedal force sensor 105 collects brake pedal force data for ultimate use by the brake controller 110 in controlling braking for the vehicle and/or calibrating the braking system 100, as described further below. It will be appreciated that multiple brake pedal force sensors 105 may be used in various embodiments.

The gear sensor 106 is coupled to a gear selector 114 of the vehicle. The gear sensor 106 provides an indication of a current gear (e.g., drive, reverse, park) in which the vehicle is operating, preferably as represented by a current position of the gear selector 114. Other methods of determining the current gear in which the vehicle is operating can also be utilized. Regardless of the particular method utilized, the gear sensor 106 collects information as to the current gear in which the vehicle is operating and for ultimate use by the brake controller 110 in controlling braking for the vehicle and/or calibrating the braking system 100, as described further below. It will be appreciated that multiple gear sensors 106 may be used in various embodiments.

The at least one wheel speed sensor 108 is coupled to one or more wheels 116 of the vehicle. The at least one wheel speed sensor 108 provides an indication of a speed of one or more of the wheels 116, which can then be utilized by the brake controller 110 in determining a speed of the vehicle and for ultimate use by the brake controller 110 in controlling braking for the vehicle and/or calibrating the braking system 100, as described further below. In one exemplary embodiment, the braking system 100 includes one wheel speed sensor 108 for each wheel 116 of the vehicle, with each wheel speed sensor 108 coupled to a different wheel 116. However, the number, placement, and coupling of the wheel speed sensors may vary in different embodiments. In addition, in certain embodiments, one or more other different types of sensors and/or other devices (such as, by way of example only, a global position system (GPS) device) may be used in measuring the vehicle speed and/or in providing information to the brake controller 110 for use in calculating the vehicle speed.

The brake controller 110 is coupled to the brake pedal travel sensor 104, the brake pedal force sensor 105, the gear sensor 106, and the at least one wheel speed sensor 108, as well as to the brake units 112. The brake controller 110 receives inputs from the brake pedal travel sensor 104 (namely, brake pedal travel data), the brake pedal force sensor 105 (namely, brake pedal force data), the gear sensor 106 (namely, gear data), and the at least one wheel speed sensor 108 (namely, wheel speed data). As described in more detail below, the brake controller 110 uses values from these inputs in calibrating the braking system 100 and in controlling braking via the brake units 112, in accordance with the process 200 of FIGS. 2 and 3 as set forth in greater detail further below.

In the depicted embodiment, the brake controller 110 includes a computer system 119 that includes a processor 120, a memory 122, an interface 123, a storage device 125, and a bus 126. The processor 120 performs the computation and control functions of the brake controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 127 contained within the memory 122 and, as such, controls the general operation of the computer system 119.

The memory 122 can be any type of suitable memory. This would include the various types of dynamic random access memory (DRAM) such as SDRAM, the various types of static RAM (SRAM), and the various types of non-volatile memory (PROM, EPROM, and flash). The memory 122 stores the above-referenced programs 127 in addition to one or more baseline mappings and/or look-up tables for use by the processor 120 in calibrating the braking system 100 and controlling braking. The bus 126 serves to transmit programs, data, status and other information or signals between the various components of the computer system 119.

The interface 123 allows communication to the computer system 119, for example from a system driver and/or another computer system, and can be implemented using any suitable method and apparatus. It can include one or more network interfaces to communicate with other systems or components. The interface 123 may also include one or more network interfaces to communicate with technicians, and/or one or more storage interfaces to connect to storage apparatuses, such as the storage device 125.

The storage device 125 can be any suitable type of storage apparatus, including direct access storage devices such as hard disk drives, flash systems, floppy disk drives and optical disk drives. In one exemplary embodiment, the storage device 125 comprises a program product from which memory 122 can receive a program 127 that executes one or more embodiments of one or more processes of the present invention, such as the process 200 of FIGS. 2 and 3 or portions thereof. In another exemplary embodiment, the program product may be directly stored in and/or otherwise accessed by the memory 122 and/or a disk (e.g., disk 130) such as that referenced below.

The bus 126 can be any suitable physical or logical means of connecting computer systems and components. This includes, but is not limited to, direct hard-wired connections, fiber optics, infrared and wireless bus technologies. During operation, the program 127 is stored in the memory 122 and executed by the processor 120. It will be appreciated that the brake controller 110 may differ from the embodiment depicted in FIG. 1, for example in that the brake controller 110 may be coupled to or may otherwise utilize one or more remote computer systems and/or other control systems.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 119 may also otherwise differ from the embodiment depicted in FIG. 1, for example in that the computer system 119 may be coupled to or may otherwise utilize one or more remote computer systems and/or other control systems.

The brake units 112 receive the brake commands from the brake controller 110, and are controlled thereby accordingly. The brake units 112 can include any number of different types of devices that, upon receipt of brake commands, can apply the proper braking torque as received from the brake controller 110. For example, in an electro-hydraulic system, the brake units 112 can comprise an actuator that can generate hydraulic pressure that can cause brake calipers to be applied to a brake disk to induce friction to stop a vehicle. Alternatively, in an electro-mechanical brake-by-wire system, the brake units 112 can comprise a wheel torque-generating device that operates as a vehicle brake. The brake units 112 can also be regenerative braking devices, in which case the brake units 112, when applied, at least facilitate conversion of kinetic energy into electrical energy.

Figure 2:
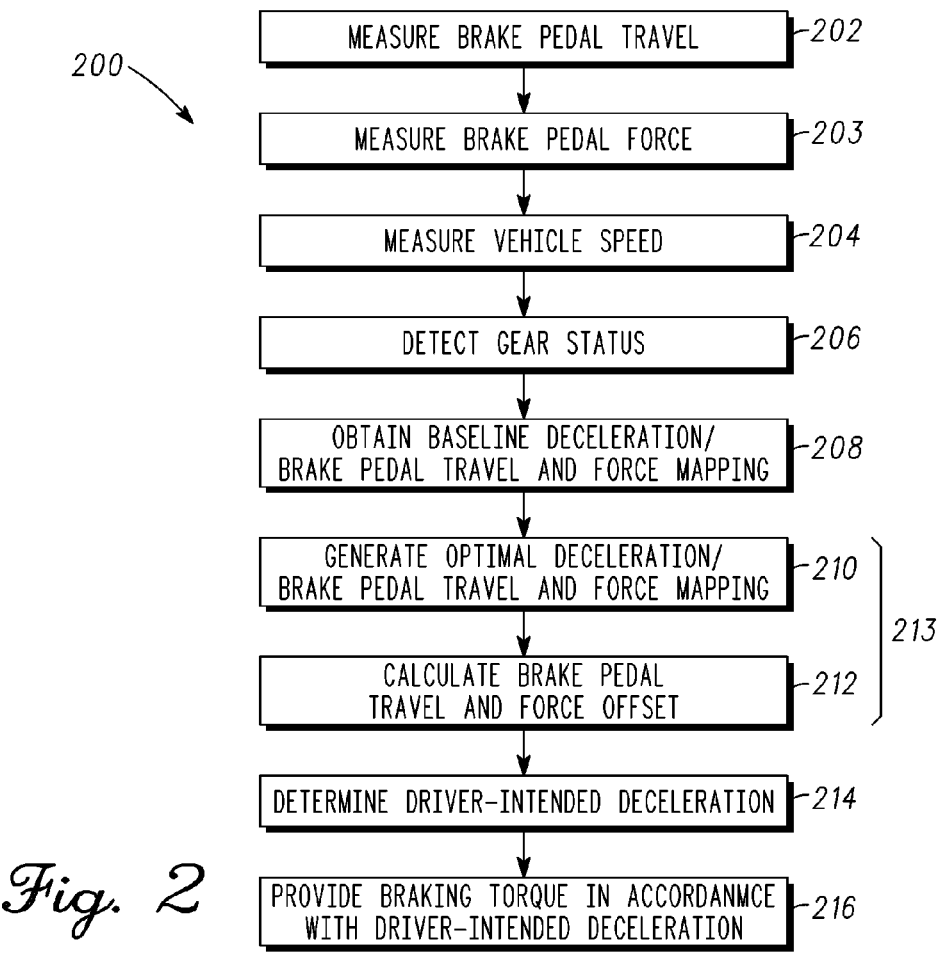
FIG. 2 is a flowchart of a process for calibrating a brake control system of a vehicle, such as the control system of FIG. 1, and controlling braking in the vehicle, in accordance with an exemplary embodiment of the present invention.

FIG. 2 is a flowchart of a process 200 for calibrating a braking system of a vehicle and controlling braking for the vehicle, in accordance with an exemplary embodiment of the present invention. The process 200 can be implemented in connection with the braking system 100 of FIG. 1 and the computer system 119 of FIG. 1 in accordance with an exemplary embodiment of the present invention. The process 200 will also be described below in connection with FIG. 3, which depicts a graphical illustration of exemplary mappings between brake pedal travel and desired braking torque and offsets for same, in accordance with an exemplary embodiment.

As depicted in FIG. 2, the process 200 begins with the step of measuring brake pedal travel (step 202). The brake pedal travel is measured based on movement of the brake pedal during operation of the vehicle. Also in a preferred embodiment, the brake pedal travel is measured by the brake pedal travel sensor 104 of FIG. 1 based on detected movement of the brake pedal 102 of FIG. 1 and provided to the processor 120 of the brake controller 110 of FIG. 1 for processing. In another preferred embodiment, the brake pedal travel is calculated by the processor 120 of the brake controller 110 of FIG. 1 based on information provided by the brake pedal travel sensor 104 of FIG. 1.

In addition, brake pedal force is measured (step 203). The brake pedal force is measured based on a force applied to the brake pedal during operation of the vehicle. Also in a preferred embodiment, the brake pedal force is measured by the brake pedal force sensor 105 of FIG. 1 based on a detected force applied to the brake pedal 102 of FIG. 1, and the measurements are provided to the processor 120 of the brake controller 110 of FIG. 1 for processing. In another preferred embodiment, the brake pedal force is calculated by the processor 120 of the brake controller 110 of FIG. 1 based on information provided by the brake pedal force sensor 105 of FIG. 1.

A vehicle speed is also measured (step 204). In one exemplary embodiment, the vehicle speed is measured by one or more wheel speed sensors 108 of FIG. 1. In another exemplary embodiment, the vehicle speed is calculated by the processor 120 of the brake controller 110 of FIG. 1 using inputs or information provided by one or more wheel speed sensors 108 of FIG. 1. In yet other exemplary embodiments, the vehicle speed is calculated by the processor 120 of the brake controller 110 of FIG. 1 using inputs or information provided by one or more other sensors and/or devices, such as, by way of example only, a global positioning system (GPS) device.

In addition, a gear status is detected (step 206). In a preferred embodiment, the gear status comprises a gear or mode in which the vehicle is operating, for example whether the vehicle is in a "drive" gear or mode, a "reverse" gear or mode, or a "park" gear or mode. Also in a preferred embodiment, the gear status is detected by the gear sensor 106 of FIG. 1. In another preferred embodiment, the gear status is determined by the processor 120 of the brake controller 110 of FIG. 1 based on inputs or information provided by the gear sensor 106 of FIG. 1.

Figure 3:
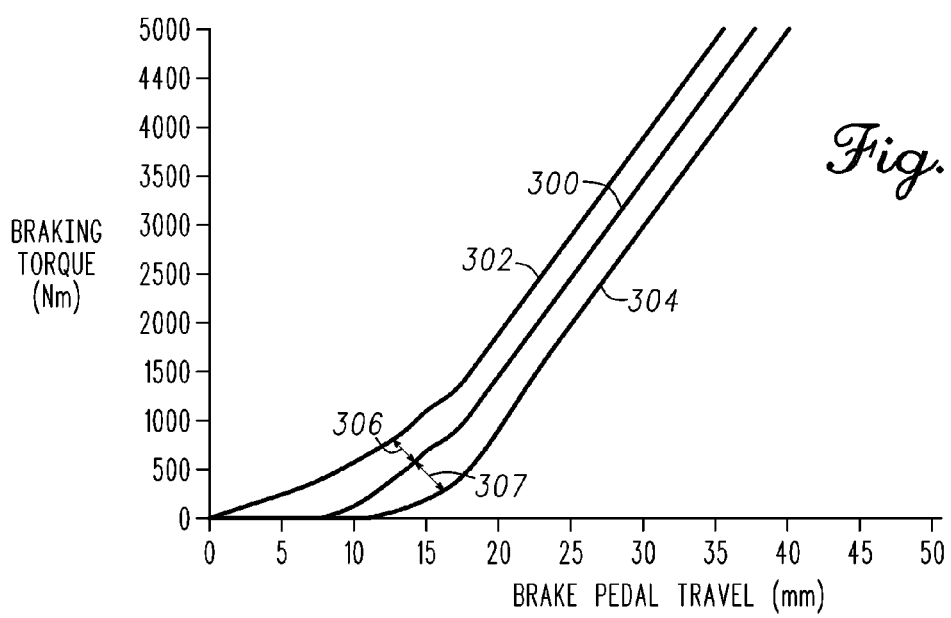
FIG. 3 is a graphical illustration of exemplary mappings between brake pedal travel and desired braking torque and offsets for same, for use with the control system of FIG. 1 and the process of FIG. 2, in accordance with an exemplary embodiment of the present invention.

A baseline mapping is also obtained (step 208). In a preferred embodiment, the baseline mapping comprises a mapping of brake pedal travel and/or brake pedal force with a driver-intended deceleration of the vehicle. Also in a preferred embodiment, the baseline mapping is independent of the vehicle speed. In addition, in a preferred embodiment, the baseline mapping corresponds to the baseline mapping 129 of FIG. 1, is stored in the memory 122 of the brake controller 110 of FIG. 1, and is retrieved from the memory 122 by the processor 120 of the brake controller 110 of FIG. 1. In one exemplary embodiment, the baseline mapping comprises a function relating brake pedal travel and/or brake pedal force with driver-intended deceleration of the vehicle. In another exemplary embodiment, the baseline mapping comprises a look-up table relating brake pedal travel and/or brake pedal force with driver-intended deceleration of the vehicle. With reference to FIG. 3, an exemplary baseline mapping is represented as baseline mapping 300 that correlates brake pedal travel with a braking torque that corresponds to the driver-intended deceleration of the vehicle.

An optimized mapping is then generated using the baseline mapping (step 210). In a preferred embodiment, the optimized mapping comprises a mapping of brake pedal travel and/or brake pedal force with driver-intended deceleration of the vehicle after taking into account the vehicle speed of step 204. Also in a preferred embodiment, the optimized mapping is generated by the processor 120 of the brake controller 110 of FIG. 1.

In addition, in a preferred embodiment, the optimized mapping is generated by adjusting the baseline mapping of step 208. In one exemplary embodiment, the optimized mapping is generated by adjusting a slope of the baseline mapping. In another exemplary embodiment, the optimized mapping is generated by adjusting an intercept of the baseline mapping. In yet another exemplary embodiment, the optimized mapping is generated by adjusting a slope and an intercept of the baseline mapping.

Specifically, in accordance with a preferred embodiment, if the vehicle speed is greater than a first predetermined threshold (such as forty miles per hour, by way of example only), then the brake pedal travel and/or brake pedal force values corresponding to all (or nearly all) decelerations values are reduced in the optimized mapping as compared with respective values in the baseline mapping. For example, with reference to FIG. 3, if the vehicle speed is greater than the first predetermined threshold, then an exemplary optimized mapping is represented in FIG. 3 as the high speed optimized mapping 302 correlating brake pedal travel with braking torque corresponding to the driver-intended deceleration of the vehicle. Under such high speed conditions, the brake-pedal is tuned so that relatively smaller movements of the brake pedal (e.g., brake pedal travel and/or brake pedal force) will result in relatively larger braking pressure, and therefore a relatively larger rate of deceleration of the vehicle (as compared with lower-speed conditions), to thereby provide the driver with a tighter brake pedal feeling and provide quicker braking responsiveness for the driver when the vehicle is operating at a relatively higher speed.

In addition, also in accordance with a preferred embodiment, if the vehicle speed is less than a second predetermined threshold (such as ten miles per hour, by way of example only), then the brake pedal travel and/or brake pedal force values for all (or nearly all) decelerations values are increased in the optimized mapping as compared with respective values in the baseline mapping. For example, with reference to FIG. 3, if the vehicle speed is less than the second predetermined threshold, then an exemplary optimized mapping is represented in FIG. 3 as the low speed optimized mapping 304 correlating brake pedal travel with braking torque corresponding to the driver-intended deceleration of the vehicle. Under such low speed conditions, the brake pedal is tuned so that relatively larger movements of the brake pedal (e.g., brake pedal travel and/or brake pedal force) will result in relatively smaller, and therefore a relatively smaller rate of deceleration of the vehicle (as compared with higher-speed conditions), to thereby provide the driver with a more flexible brake pedal feeling and provide more precision as to the desired deceleration of the vehicle, for example if the vehicle is being operated in a parking lot or under some other low-speed conditions.

Also in one preferred embodiment, a baseline mapping (such as the exemplary baseline mapping 300 of FIG. 3) is utilized in situations in which the vehicle speed is greater than or equal to the second predetermined threshold (for example, ten miles per hour, in one exemplary embodiment) and less than or equal to the first predetermined threshold (for example, forty miles per hour, in one exemplary embodiment). Alternatively, in certain embodiments, the first and second predetermined thresholds may be equal to one another (such as, by way of example only, twenty miles per hour). In such embodiments, the baseline mapping (such as the exemplary baseline mapping 300 of FIG. 3) is preferably not used. Rather, the baseline mapping is preferably substituted in such cases at all (or nearly all) times with either a high speed mapping (such as the exemplary high speed optimized mapping 302 of FIG. 3, for speeds above the first/second predetermined threshold) or a low speed optimized mapping (such as the low speed optimized mapping 304 of FIG. 3, for speeds below the first/second predetermined threshold).

Returning now to FIG. 2, in certain embodiments, a brake pedal travel and force offset is calculated (step 212). The brake pedal travel and force offset represents a difference in a brake pedal travel value and/or a brake pedal force value as compared with the baseline mapping. In a preferred embodiment, the brake pedal travel and force offset is calculated by the processor 120 of the brake controller 110 of FIG. 1 based on the vehicle speed of step 204.

With reference again to FIG. 3, in one preferred embodiment, the brake pedal travel and force offset comprises a negative brake pedal travel offset 306 as compared with the baseline mapping 300 if the vehicle speed is greater than the above-referenced first predetermined threshold. Also in a preferred embodiment, the brake pedal travel offset comprises a positive brake pedal travel offset 307 as compared with the baseline mapping 300 if the vehicle speed is less than the above-referenced second predetermined threshold. In addition, as depicted in FIG. 3, an aggregate offset can be calculated by adding the absolute values of the positive brake pedal travel offset and the negative brake pedal travel offset together. The aggregate offset reflects a difference in brake pedal travel values between relatively high speed conditions and relatively low speed conditions, and can also be utilized as the brake pedal travel offset of step 212 (for example, in situations, such as those described above, in which only the high speed optimized mapping and the low speed optimized mapping are utilized for the brake pedal tuning and braking system calibration).

As depicted in FIG. 2, steps 210 and 212 may be collectively considered to comprise a combined step 213 of tuning the brake pedal 102 of FIG. 1. Accordingly, during the combined step 213, the driver is provided with a relatively tighter or more sensitive brake pedal 102 tuning when driving at relatively higher speeds, in order to provide quick responsiveness to driver inputs and resulting shorter braking distances under relatively high-speed conditions. In addition, during the combined step 213, the driver is provided with a relatively more flexibly or less sensitive brake pedal 102 tuning when driving at relatively low speeds (for example, when driving in a parking lot), in order to provide the driver with more precision as to the desired deceleration of the vehicle under relatively low-speed conditions.

In addition, in certain embodiments, the calibration and tuning of the combined step 213 are also based in part upon the gear status as detected in step 206. For example, in one preferred embodiment, the low speed optimized mapping 304 and the positive brake pedal travel offset 307 of FIG. 3 are not implemented if the vehicle is being operated in a reverse gear or driving mode. In one such preferred embodiment, the baseline mapping 300 or the high-speed optimized mapping 302 are instead utilized in such situations in which the vehicle is being operated in a reverse gear or driving mode.

A driver-intended deceleration is then calculated (step 214). In a preferred embodiment, the driver-intended deceleration comprises a rate of deceleration of the vehicle corresponding to the driver inputs to the brake pedal 102, and thereby approximating the intent of the driver. Also in a preferred embodiment, the driver-intended deceleration is calculated using the brake pedal travel information of step 202, the brake pedal force information of step 203, and the optimized mapping and/or the brake pedal and travel offset of steps 210, 212. In addition, in a preferred embodiment, the driver-intended deceleration is calculated by the processor 120 of the brake controller 110 of FIG. 1.

Braking torque is then provided in accordance with the driver-intended deceleration (step 216). In a preferred embodiment, the braking torque is provided to the brake units 112 based on instructions provided by the processor 120 of the brake controller 110 of FIG. 1. Also in a preferred embodiment, the braking torque is provided in an amount that results in a deceleration of the vehicle that approximates the desired rate of deceleration of the vehicle as reflected in the driver-intended deceleration of step 214.

Accordingly, improved methods and systems are provided. The methods and systems provide for improved braking system calibration and braking control using brake pedal travel, brake pedal force, and the speed of the vehicle. For example, a relatively tighter or more sensitive brake pedal tuning is provided when the vehicle is operating at relatively higher speeds, to thereby provide quick responsiveness to driver inputs and shorter braking distances under relatively high-speed conditions. In addition, a relatively more flexibly or less sensitive brake pedal tuning is provided when the vehicle is operating at relatively low speeds (for example, when driving in a parking lot), to thereby provide the driver with more precision as to the desired deceleration of the vehicle under relatively low-speed conditions. In addition, in certain embodiments, the gear status of the vehicle is also taken into account, for example to provide a tighter brake pedal feel when the vehicle is operating in a reverse gear or driving mode regardless of the speed of the vehicle.

It will be appreciated that the disclosed methods and systems may vary from those depicted in the Figures and described herein. It will similarly be appreciated that the disclosed method and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for calibrating a braking system of a vehicle having a brake pedal, the method comprising the steps of:
   measuring, via a sensor, a speed of the vehicle;
   obtaining, via the processor, a baseline mapping relating non-emergency movement of the brake pedal and the deceleration of the vehicle independent of the speed of the vehicle;
   adjusting, via the processor, baseline mapping downward, so that non-emergency movement of the brake pedal is relatively smaller for given decelerations of the vehicle as compared with the baseline mapping, if the speed of the vehicle is greater than a predetermined threshold; and
   adjusting, via the processor, the baseline mapping upward, so that non-emergency movement of the brake pedal is relatively larger for given decelerations of the vehicle as compared with the baseline mapping, if the speed of the vehicle is less than a second predetermined threshold.

2. The method of claim 1, wherein:
   the baseline mapping has a slope;
   the step of adjusting, via the processor, the baseline mapping downward comprises adjusting a slope of the baseline mapping downward if the speed of the vehicle is greater than the predetermined threshold; and
   the step of adjusting, via the processor, the baseline mapping upward comprises adjusting the slope of the baseline mapping upward if the speed of the vehicle is less than the second predetermined threshold.

3. The method of claim 1, wherein:
   the baseline mapping has an intercept; and
   the step of adjusting, via the processor, the baseline mapping downward comprises adjusting the intercept of the baseline mapping downward if the speed of the vehicle is greater than the predetermined threshold; and
   the step of adjusting, via the processor, the baseline mapping upward comprises adjusting the intercept of the baseline mapping upward if the speed of the vehicle is less than the second predetermined threshold.

4. The method of claim 1, further comprising the step of:
   detecting, via a second sensor, a gear in which the vehicle is operating;
   wherein the adjusting of the baseline mapping is also based at least in part on the gear in which the vehicle is operating.

5. The method of claim 4, wherein:
   the step of detecting the gear in which the vehicle is operating comprises the step of detecting, via the second sensor, whether the vehicle is operating in a reverse gear; and
   the the baseline mapping is adjusted via the processor provided further that the vehicle is not operating in the reverse gear.

6. A method for controlling braking in a vehicle having a brake pedal and brake units, the method comprising the steps of:
   measuring non-emergency movement of the brake pedal;
   measuring a speed of the vehicle;
   obtaining a baseline mapping relating non-emergency movement of the brake pedal and the driver-intended deceleration of the vehicle independent of the speed of the vehicle;
   generating an optimized mapping by:
   adjusting the baseline mapping downward, so that non-emergency movement of the brake pedal is relatively smaller for given decelerations of the vehicle as compared with the baseline mapping, if the speed of the vehicle is greater than a predetermined threshold; and
   adjusting the baseline mapping upward, so that non-emergency movement of the brake pedal is relatively larger for given decelerations of the vehicle as compared with the baseline mapping, if the speed of the vehicle is less than a second predetermined threshold; and
   providing braking torque to the brake units in an amount based at least in part on non-emergency movement of the brake pedal and the speed of the vehicle utilizing the baseline mapping and the optimized mapping.

7. The method of claim 6, further comprising the step of:
   calculating a driver-intended deceleration of the vehicle based at least in part upon the movement of the brake pedal and the speed of the vehicle;
   wherein the step of providing the braking torque comprises the step of providing the braking torque to the brake units in accordance with the driver-intended deceleration of the vehicle utilizing the baseline mapping and the optimized mapping.

8. The method of claim 7,
   wherein the step of calculating the driver-intended deceleration of the vehicle comprises the step of calculating the driver-intended deceleration based at least in part upon the movement of the brake pedal and the optimized mapping.

9. A system for controlling braking in a vehicle, the system comprising:
   a brake pedal;
   a first sensor configured to at least facilitate measuring non-emergency movement of the brake pedal;
   a second sensor configured to at least facilitate measuring a speed of the vehicle; and
   a brake controller coupled to the first sensor and the second sensor and configured to at least facilitate:
   obtaining a baseline mapping relating non-emergency movement of the brake pedal and the driver-intended deceleration of the vehicle independent of the speed of the vehicle;
   generating an optimized mapping by:
   adjusting the baseline mapping downward, so that non-emergency movement of the brake pedal is relatively smaller for given decelerations of the vehicle as compared with the baseline mapping, if the speed of the vehicle is greater than a predetermined threshold; and adjusting the baseline mapping upward, so that non-emergency movement of the brake pedal is relatively larger for given decelerations of the vehicle as compared with the baseline mapping, if the speed of the vehicle is less than a second predetermined threshold; and providing braking torque in an amount based at least in part on the movement of the brake pedal and the speed of the vehicle utilizing the baseline mapping and the optimized mapping.

10. The system of claim 9, wherein the brake controller is further configured to at least facilitate:

calculating a driver-intended deceleration of the vehicle based at least in part upon the movement of the brake pedal and the speed of the vehicle; and providing the braking torque in accordance with the driver-intended deceleration of the vehicle utilizing the baseline mapping and the optimized mapping.

11. The system of claim 10, wherein the brake controller is further configured to at least facilitate:

calculating the driver-intended deceleration based at least in part upon the movement of the brake pedal and the optimized mapping.

12. The system of claim 11, further comprising:

a third sensor configured to at least facilitate detecting a gear in which the vehicle is operating;

wherein the brake controller is coupled to the third sensor and is further configured to at least facilitate adjusting the baseline mapping provided further that the vehicle is not operating in a reverse gear.

* * * * *